United States Patent
Nakamura et al.

[11] 4,028,963
[45] June 14, 1977

[54] ENGINE BALANCER

[75] Inventors: Hirokazu Nakamura; Mitsutaka Kinoshita; Seizo Iwasa, all of Kyoto, Japan

[73] Assignee: Mitsubishi Jidosha Kogyo Kabushiki Kaisha, Japan

[22] Filed: July 9, 1975

[21] Appl. No.: 594,232

[30] Foreign Application Priority Data
   July 16, 1974   Japan ............................ 49-82043

[52] U.S. Cl. .............................. 74/604; 123/192 B
[51] Int. Cl.² ........................................ F16F 15/10
[58] Field of Search ............ 74/604, 603; 123/192 B

[56]            References Cited
          UNITED STATES PATENTS

| | | | |
|---|---|---|---|
| 1,898,459 | 2/1933 | Newcomb | 74/604 |
| 2,838,957 | 6/1958 | Johnson | 74/604 |
| 2,914,137 | 11/1959 | Sykes, Jr. | 74/604 X |
| 2,914,964 | 12/1959 | Bensinger et al. | 74/604 |
| 3,511,110 | 5/1970 | Grieve | 74/604 |

FOREIGN PATENTS OR APPLICATIONS 674,225   6/1952   United Kingdom ............ 123/192 B Primary Examiner—Samuel Scott
Assistant Examiner—F. Shoemaker
Attorney, Agent, or Firm—Robert E. Burns; Emmanuel J. Lobato; Bruce L. Adams

[57]            ABSTRACT

Balancer shafts are provided on the right and left of the crank shaft of an engine and so as to be driven thereby. Each balancer shaft has a balance weight divided into two portions, one on either side of a bearing supporting the balancer shaft. This construction protects the bearings from undesirable wear.

11 Claims, 7 Drawing Figures

FIG. IA
PRIOR ART
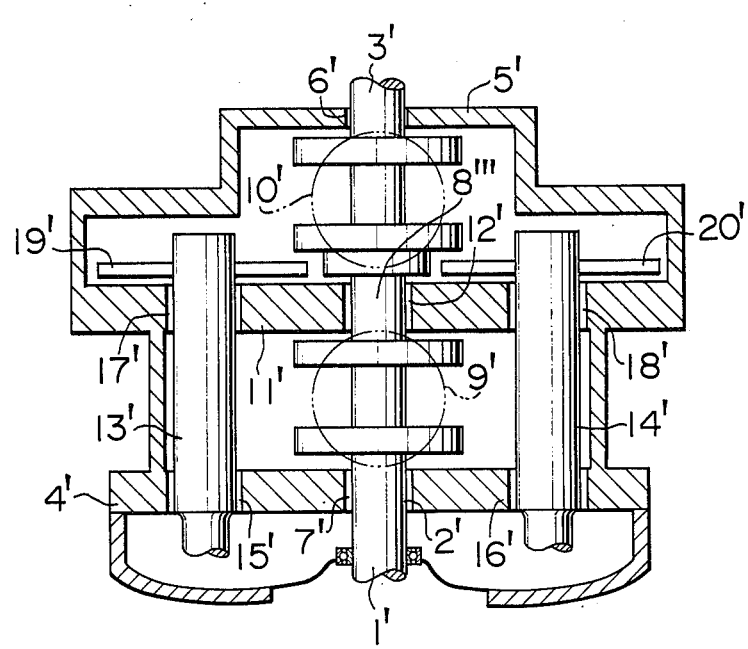
FIG. IB
PRIOR ART
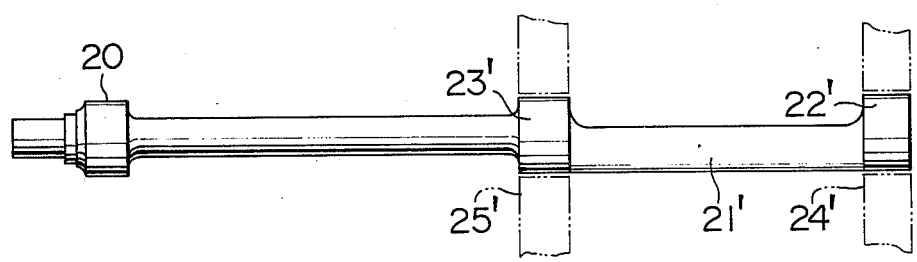

ENGINE BALANCER

BACKGROUND OF THE INVENTION

It is generally desirable to dispose balance weights of a balancer in a reciprocating piston engine within a plane that intersects the center of a crank shaft at right angles with its axis, with their shafts being supported by a diaphragm or cylinder-partition portion, having high rigidity, of a cylinder block between cylinders. However, it is usually impossible to dispose the balance weights within such plane intersecting the center of the crank shaft, because said diaphragm of the cylinder block is placed therein.

In order to make it clearer, a conventional balancer of this type in a two-cylinder engine will be illustrated with reference to FIG. 1A. Journals 2' and 3' at both ends of a crank shaft 1' are supported by bearings 6' and 7' in front and rear walls 4' and 5' of a cylinder block, respectively. Meanwhile, a journal 8''' at the center of said crank shaft is supported by a bearing 12' in a diaphragm portion 11' of the cylinder block interposed between a first cylinder 9' and a second cylinder 10'. Therefore, in order to dispose balance weights 19' and 20' near the center of said crank shaft, balancer shafts 13' and 14' must be supported by bearings 15' and 16' provided in the front wall 4' and bearings 17' and 18' in the diaphragm 11' of said cylinder block, respectively. Consequently, the balance weights 19' and 20' are cantilevered as illustrated in FIG. 1A.

When the engine of this type in which the balance weights 19' and 20' are cantilevered is used for a long time, only one side of said balance weights become worn down as a result of coming in contact with the bearings 17' and 18'. This has caused vibrations, which in turn has produced cracks in the cylinder block and thereby shortened the life of the engine.

In an arrangement shown in FIG. 1B, a balance weight of the above-described type is not cantilevered. That is, balancer shaft journals 22' and 23' at both ends of a balance weight portion 21' are supported by bearings 24' and 25' provided in the cylinder block. A disadvantage of this arrangement is that provision of an additional bearing results in an increase in cost. Besides, as in the case of the above-described conventional system shown in FIG. 1A, the balance weight cannot be disposed along the plane passing through the center of the crank shaft, occupied by the diaphragm portion 11' of the cylinder block. Furthermore, the use of the two bearings 24' and 25' makes it impossible to place them in the diaphragm portion of the cylinder block that has high rigidity. Consequently, at least one of them has to be placed in a less rigid portion of the cylinder block. This has caused vibration, resonance and noises.

In addition, even in the case of FIG. 1B, the facing sides of the bearings 24' and 25' have seized as a result of coming in contact with the balance weight when the balancer shaft rotated at high speed.

SUMMARY OF THE INVENTION

An object of this invention is to eliminate the aforementioned shortcomings in the conventional systems. To be more precise, this invention provides a balancer for an engine in which at least a pair of balancer shafts, each formed with a balance weight balanced, in combination, with the whole reciprocating mass such as pistons and connecting rods, are provided on both ends of a crank shaft, and said balancer shafts are driven by said crank shaft, characterized by dividingly forming said balance weight on both sides of a journal portion of each balancer shaft so that the divided balance weights are supported by such portions.

Brief Description of the Drawings

Now an embodiment of this invention will be described in detail with reference to the drawings.

FIGS. 1A and 1B schematically illustrate the balancers in the conventional engines.

DESCRIPTION OF THE PREFERRED EMBODIMENT

Figure 5:
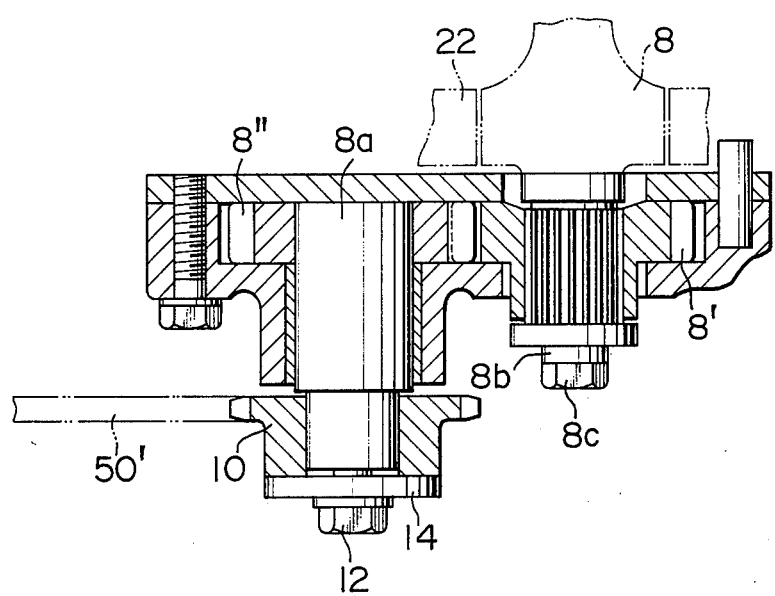
FIG. 5 schematically shows a reversing mechanism for the right-hand balancer shaft 8 in FIG. 3.

In these drawings, reference numeral 1 designates a cylinder block, 2 a cylinder head, 3 a rocker-arm cover of said cylinder head 2, 4 an oil pan fitted under said cylinder block, 5 a crank shaft, 6 a left-hand balancer shaft disposed at the side of a cylinder section 7 of said cylinder block 1, and 8 a right-hand balancer shaft disposed similarly at the opposite side of said cylinder section 7 but opposite to said left-hand balancer shaft 6 (FIG. 5). These left-hand and right-hand balancer shafts have the same shape. The balancer shaft 8 is driven by an idle sprocket shaft 8a that is mounted with a gear 8'' adapted to engage with a gear 8' fixed to said balancer shaft 8, as illustrated in FIG. 5. The gear 8' is fitted to the balancer shaft 8 through a washer 8b and a bolt 8c. Reference numerals 9 and 10 denote sprockets which are fixed to the end of said balancer shaft 6 and idle sprocket shaft 8a through bolts 11 and 12 and washers 13 and 14, respectively. These sprockets are interlockingly driven by the crank shaft 5 through a sprocket 15 fitted thereto the latter and chain 50.

Figure 2:
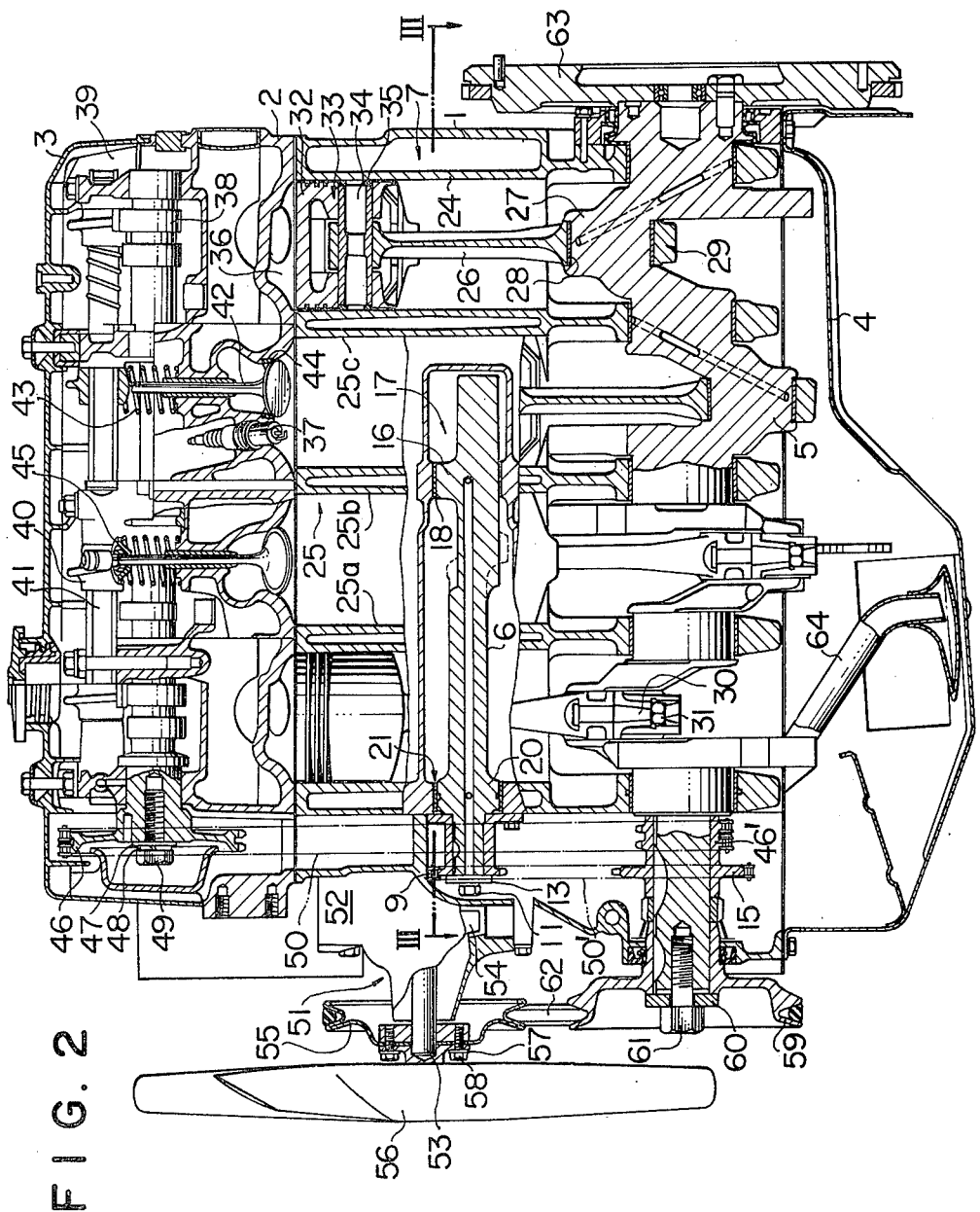
FIG. 2 is a schematic cross sectional view, with a part thereof cut open, showing a balancer according to this invention used in an in-line 4-cylinder engine.
Figure 4A:
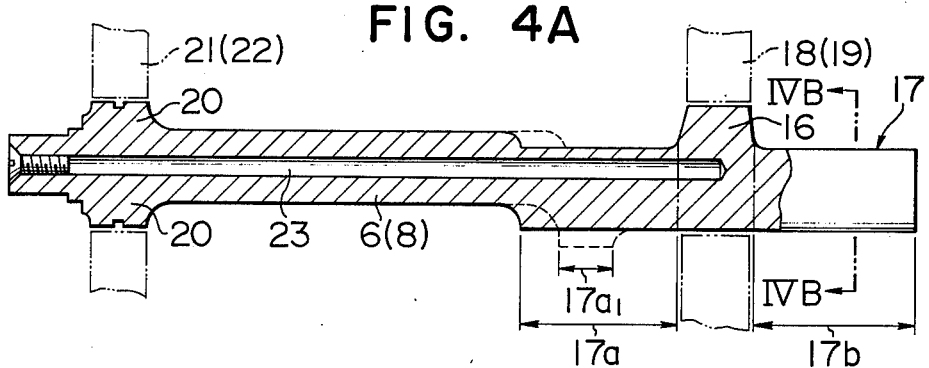
FIG. 4A schematically illustrates a pair of balancer shafts in the balancer of this invention.
Figure 4B:
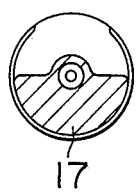
FIG. 4B is a cross sectional view taken along the line IVB—IVB of FIG. 4A.

Further, reference numeral 16 represents a journal on that end of a balancer shaft or 8 on which a balance weight is formed. As shown in FIGS. 2 and 4, a balance weight 17 is dividedly formed at desired positions 17a and 17b along the axis of said balancer shaft, on both sides of the journal 16. The balance weight 17 is so arranged as to be supported, through the journal 16, by a bearing 18, or 19, provided on either side of the cylinder block 1.

In the embodiment illustrated in said figures, the balance weight 17 is divided into two portions 17a, 17b of equal mass, which are formed on both sides of journal 16 and which extend equal distances on both sides of the axis of said journal, bisecting the whole mass of the balance weight. But it is also possible to divide its mass in other suitable proportion, and to adjust its extending distances on both sides of said axis in inverse proportion. For instance, as shown by a dotted line in FIG. 4, a divided portion may be located closer to the journal.

Figure 3:
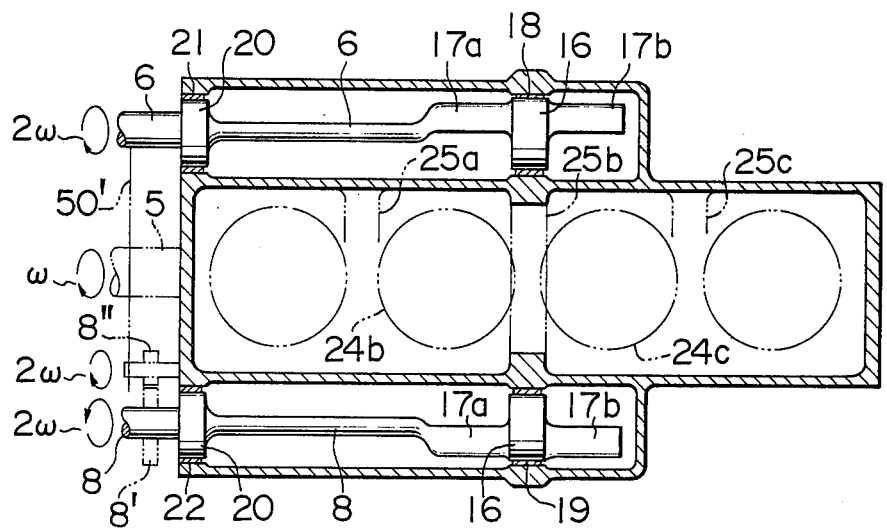
FIG. 3 is a cross sectional view taken along the line III—III of FIG. 2, schematically showing the positional relationship of the balancer to the cylinder block.

Reference numeral 20 designates a journal on that end of either balancer shaft 6, 8 where the sprocket 9 or 10 is attached. Substantially like the journals 16, these journals 20 are supported by bearings 21 and 22, provided at both sides of the front of the cylinder block. Reference numeral 23 (FIG. 4a) denotes a lubricating passage formed in each balancer shaft 6 and 8. By means of an oil pump not shown, the lubricating oil in the oil pan 4 is supplied through the lubricating passage 23 to the bearings 18, 19, 21 and 22. The bearings 18 and 19 supporting the balance weights 17 are provided at both sides of a highly rigid portion of the cylinder block 1 where a diaphragm 25 (or a diaphram between diaphragms 25a and 25b and 25c in the case of a 4-cylinder engine) between cylinders 24 is formed, so that the load of said balance weights is received thereby. In a multiple-cylinder engine, such as the 4-cylinder engine used in this embodiment, the bearings 18 and 19 are provided a diaphragm portion at the longitudinal center of the cylinder block that is, where a diaphragm 25b between the second cylinder 24b and the third cylinder 24c is formed (FIG. 3).

Certain parts of the new engine and balancer unit are approximately similar to those of the conventional engines. Their description will be confined to principal parts. Reference numeral 26 designates a connecting rod whose big end 29 is connected to a crank pin 27 of said crank shaft 5, through a bearing 28, with a bolt 30 and a nut 31; 32, a piston pivotally received by the small end 33 of said connecting rod 26 through, with a piston pin 34 and a snap ring 35; 36, a combustion chamber; 37, a spark ignition plug; 38, a cam shaft provided in a rocker chamber 39; 40, a rocker arm pivotally supported by a rocker shaft 41; 42, an inlet valve adapted to be opened and closed by the action of said cam shaft 38 through said rocker arm 40 and a valve spring 43; 44, a valve seat; 45, a retainer; 46, a timing sprocket fitted to said cam shaft 38 by a bolt 49 through washers 47 and 48; and 50, a timing chain for driving the cam shaft 38 at a speed half the rotating speed of the crank shaft engaged with said timing sprocket 46 and a sprocket 46' mounted on crank shaft 5. Reference numeral 51 designates a water pump provided in front of the cylinder block 1, which comprises a pump casing 52, a shaft 53, an impeller 54, and so on. Reference numeral 55 denotes a belt pulley fitted to the shaft 53 of said pump 51. To this pulley 55 is fitted a radiator cooling fan 56 by a bolt 58 through a washer 57. Reference numeral 59 indicates a belt pulley fitted to the front end of the crank shaft 5 by a bolt 61 through a washer 60. A belt 62 engaged with the pulleys 55 and 59 transmits the rotation of the crank shaft 5 to the water pump 51, a dynamo not shown, etc. Reference numeral 63 designates a flywheel, and 64 an inlet pipe of the oil pump not shown. In this embodiment that is constructed as described above, the cam shaft 38 is rotated by the chain 50 through the sprockets 46 and 46' when the engine is started and the crank shaft 5 is rotated at an angular velocity $\omega$ in the direction indicated by the arrow in FIG. 3. When the crank shaft 5 rotates at said angular velocity $\omega$ in said direction, the balancer shaft 6 is rotated at an angular velocity $2\omega$ in the same direction as the crank shaft 5, through the chain 50 and the sprocket 10. Meanwhile, the balancer shaft 8 is rotated at the same angular velocity $2\omega$ but in the direction opposite to that in which the balancer shaft 6 rotates, through the idle sprocket 10 and the idle sprocket shaft 8a. By this means, vibrations of the engine which might be caused by its reciprocating members during its operation can be prevented. As indicated by reference numerals 17a and 17b, the balance weight 17 is bisected on both sides of the journal 16 of each balancer shaft supported by the bearing 18 or 19, along the axis of the balancer shaft, so that the load of the balance weights should be received by said bearings 18 and 19. Consequently, the bearings are prevented from coming in contact with the balance weights on either side, and from resultant distorted wearing, thereby prolonging the life of the bearings and reducing the occurrence of engine vibrations. Further, said bearings are disposed in vicinity of the rigid cylinder block diaphragm 25b so that the load of the balance weights, which as known results from the centrifugal forces acting on them due to their rotation, is received thereby, as the result of which breakage, vibration and resonance of the cylinder block and noises ascribable thereto can be prevented. In addition, the load of the balance weights is not imposed substantially on other bearings 21 and 22, which is conducive to increasing the reliability of the entire system. On top of all this, the balancer shaft, excepting that portion where the balance weight is formed, does not substantially carry any part of the balance weight. Therefore, the balancer shaft requires only such a size as is enough to permit interlocked rotation of the balance weight with the crank shaft, as described previously. So its diameter can be reduced compared with the conventional ones, thereby decreasing its cost and the size of the entire engine. As is evident from the above, this invention can produce many remarkable results.

What is claimed is:
1. An engine balancer shaft, comprising;
   an elongate shaft body having two end portions;
   a journal on each end portion; and
   a balance weight disposed on one of the two end portions and consisting of two balance weight portions, one portion being disposed on each side of the corresponding journal to equalize centrifugal force loads acting on the balance weight on either side of the journal upon rotation of the shaft body.
2. An engine balancer shaft according to claim 1 in which the two balance weight portions have substantially equal masses, and have substantially equal lengths along the elongate shaft body.
3. An engine balancer shaft according to claim 1 in which the two balance weight portions have different masses, and have lengths along the elongate shaft body which are inversely proportional to said masses.
4. An engine balancer, comprising;
   a pair of balance shafts, one disposed on either side of a crankshaft and substantially parallel thereto, each balance shaft having two end portions and having a journal on each end portion;
   means for rotating the balance shafts, in directions opposite to one another, at a speed equal to twice a speed of the crankshaft;
   means for supporting each balance shaft in two bearings, one around each journal of the balance shaft; and
   a pair of balance weights, one on each balance shaft, each integral with one of the end portions of the respective shaft, and each consisting of a pair of balance weight portions, one weight portion being disposed one each side of the journal on the corresponding end portion, thereby minimizing differences between centrifugal force loads acting on balance weight portions on different sides of the respective bearings on rotation of the balance shafts.

5. An engine balancer according to claim 4 in which the means for rotating the balance shafts comprise sprocket and chain means drivable by the crankshaft to drive one of the end portions of each balance shaft.

6. An engine balancer according to claim 5 in which the sprocket means are disposed at the end portions of each balance shaft spaced from the corresponding balance weight.

7. An engine, comprising;
a cylinder block having cylinders therein;
pistons reciprocatable in the cylinders;
a crankshaft drivably connected with the pistons;
a pair of balance shafts, one disposed on either side of the crankshaft and substantially parallel thereto, to balance loads imposed on the crankshaft by reciprocation of the pistons, each balance shaft having two end portions, and having a journal on each end portion;
drive means connected with the crankshaft for rotating the balance shafts, in directions opposite to one another, at a speed equal to twice a speed of the crankshaft;
a bearing for each journal, in the cylinder block; and
a balance weight on each balance shaft, integral with one of the end portions and consisting of two balance weight portions, one portion being disposed on either side of the corresponding journal to minimize vibration of the cylinder block on rotation of the balance shafts.

8. An engine according to claim 7 in which the cylinder block has a cylinder partitioning portion supporting the bearings which correspond to the journals on the end portions integral with the balance weights.

9. An engine according to claim 8 in which the cylinder partitioning portion is disposed substantially in a middle part of the block, longitudinally of the crankshaft.

10. An engine according to claim 7, in which the balance shafts and their bearings are disposed at different levels of the cylinder block.

11. An engine according to claim 10 in which the drive means connected with the crankshaft are disposed to rotate one of the balance shafts in a direction opposite to a rotary direction of the crankshaft.

* * * * *

REEXAMINATION CERTIFICATE (1662nd)

United States Patent [19]

Nakamura et al.

[11] B1 4,028,963
[45] Certificate Issued  Mar. 24, 1992

[54] ENGINE BALANCER

[75] Inventors: Hirokazu Nakamura; Mitsutaka Kinoshita; Seizo Iwasa, all of Kyoto, Japan

[73] Assignee: Mitsubishi Jidosha Kogyo Kabushiki Kaisha, Tokyo, Japan

Reexamination Request:
No. 90/001,267, Jun. 25, 1987

Reexamination Certificate for:
Patent No.: 4,028,963
Issued: Jun. 14, 1977
Appl. No.: 594,232
Filed: Jul. 9, 1975

[30] Foreign Application Priority Data

Jul. 16, 1974 [JP] Japan .................... 49-82043

[51] Int. Cl.⁵ .................... F16C 3/04; F16F 15/10; F02B 75/06
[52] U.S. Cl. .................... 74/604; 123/192 B
[58] Field of Search .................... 74/604; 123/192 B

[56] References Cited
U.S. PATENT DOCUMENTS

| | | |
|---|---|---|
| 1,898,459 | 2/1933 | Newcomb .................... 74/604 |
| 2,439,035 | 4/1948 | Bidwell et al. |
| 2,688,839 | 9/1954 | Daub .................... 74/604 |
| 2,838,957 | 6/1958 | Johnson .................... 74/604 |
| 2,914,137 | 11/1959 | Sykes, Jr. .................... 74/604 X |
| 2,914,964 | 12/1959 | Bensinger et al. .................... 74/604 |
| 3,511,110 | 5/1970 | Grieve |
| 3,800,625 | 4/1974 | Seino et al. .................... 123/192 B X |
| 3,995,610 | 12/1976 | Nakamura et al. .................... 123/192 B |
| 4,000,666 | 1/1977 | Ito et al. .................... 123/192 B X |

FOREIGN PATENT DOCUMENTS

| | | |
|---|---|---|
| 2113193 | 9/1972 | Fed. Rep. of Germany . |
| 819193 | 10/1937 | France .................... 74/604 |
| 0674225 | 6/1952 | United Kingdom . |

OTHER PUBLICATIONS

ATZ 64, vol. 10, Oct., 1962, pp. 306-311 with portion translated.
Ford Motor Co. Blueprint No. 1143 6208, Jun. 28, 1970.
Automobile Engineer, Sep. 1964, "Ford Taunus 12M Engines", pp. 380-384.

Primary Examiner—Rodney M. Lindsey

[57] ABSTRACT

Balancer shafts are provided on the right and left of the crank shaft of an engine and so as to be driven thereby. Each balancer shaft has a balance weight divided into two portions, one on either side of a bearing supporting the balancer shaft. This construction protects the bearings from undesirable wear.

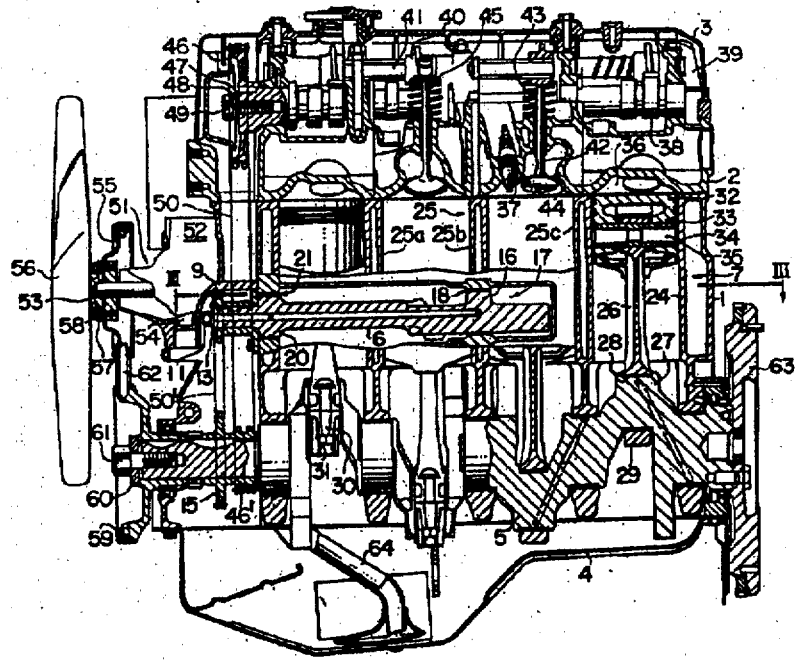

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–11 are cancelled.

New claims 12 and 13 are added and determined to be patentable.

*12. An in-line 4-cylinder engine comprising a cylinder block having four cylinders therein; pistons reciprocatable in the cylinders;*
*a crankshaft drivably connected with the pistons;*
*a pair of balance shafts, one disposed on either side of the crankshaft and substantially parallel thereto, to balance loads imposed on the crankshaft by reciprocation of the pistons, each balance shaft having two end portions, and having a journal on each end portion;*
*drive means connected with the crankshaft for rotating the balance shafts, in directions opposite to one another, at a speed equal to twice a speed of the crankshaft;*
*a bearing for each journal, in the cylinder block;*
*one balance weight only on each balance shaft, integral with one of the end portions and consisting of two balance weight portions only, one portion being disposed on either side of the corresponding journal to minimize vibration of the cylinder block on rotation of the balance shafts; and*
*the two balance weight portions of each of the balance shafts being disposed on opposite sides of a common transverse plane disposed transversely of the crankshaft, and said plane being disposed such that two cylinders of said four cylinders are disposed on opposite sides of said plane.*

*13. An in-line 4 cylinder engine according to claim 12, in which said plane passes through said corresponding journal of each of the two balance shafts on either side of which the two balance weight portions are disposed.*

* * * * *